(12) United States Patent
Duan et al.

(10) Patent No.: US 11,544,474 B2
(45) Date of Patent: Jan. 3, 2023

(54) GENERATION OF TEXT FROM STRUCTURED DATA

(71) Applicant: Microsoft Technology Licensing, LLC, Redmond, WA (US)

(72) Inventors: Nan Duan, Redmond, WA (US); Yuanhua Lv, Redmond, WA (US); Ming Zhou, Beijing (CN); Duyu Tang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 16/765,335

(22) PCT Filed: Dec. 6, 2018

(86) PCT No.: PCT/US2018/064149
§ 371 (c)(1),
(2) Date: May 19, 2020

(87) PCT Pub. No.: WO2019/118256
PCT Pub. Date: Jun. 20, 2019

(65) Prior Publication Data
US 2020/0356729 A1 Nov. 12, 2020

(30) Foreign Application Priority Data

Dec. 15, 2017 (CN) .......................... 201711348978.7

(51) Int. Cl.
*G06F 40/126* (2020.01)
*G06F 40/284* (2020.01)
(Continued)

(52) U.S. Cl.
CPC ............ *G06F 40/40* (2020.01); *G06F 16/258* (2019.01); *G06F 40/177* (2020.01);
(Continued)

(58) Field of Classification Search
None
See application file for complete search history.

(56) References Cited

U.S. PATENT DOCUMENTS 9,754,041 B2 * 9/2017 Davis .................... G06F 16/951
10,089,580 B2 * 10/2018 Shan .................... G06F 16/3329
(Continued)

FOREIGN PATENT DOCUMENTS

CN 106845139 A 6/2017
CN 107193792 A 9/2017

OTHER PUBLICATIONS

"Office Action Issued in European Patent Application No. 18821969.5", dated Feb. 7, 2022, 6 Pages.
(Continued)

*Primary Examiner* — Ariel Mercado
(74) *Attorney, Agent, or Firm* — Schwegman Lundberg & Woessner, P.A.

(57) ABSTRACT

Implementations of the subject matter described herein provide a solution for generating a text from the structured data. In this solution, the structured data is converted into its representation, where the structured data comprises a plurality of cells, and the representation of the structured data comprises plurality of representations of the plurality of cells. A natural language sentence associated with the structured data may be determined based on the representation of the structured data, thereby implementing the function of converting the structured data into a text.

10 Claims, 4 Drawing Sheets

(51) Int. Cl.
*G06F 40/40* (2020.01)
*G06F 16/25* (2019.01)
*G06F 40/279* (2020.01)
*G06F 40/177* (2020.01)
*G06N 3/04* (2006.01)
*G06N 3/08* (2006.01)

(52) U.S. Cl.
CPC ......... *G06F 40/279* (2020.01); *G06N 3/0445* (2013.01); *G06N 3/08* (2013.01)

(56) References Cited

U.S. PATENT DOCUMENTS

| | | |
|---|---|---|
| 10,949,602 B2 * | 3/2021 | Snider ............... G06F 40/169 |
| 2004/0117739 A1 | 6/2004 | Challenger et al. |
| 2016/0352656 A1 | 12/2016 | Galley et al. |
| 2018/0336193 A1 * | 11/2018 | Liu ..................... G06N 20/00 |

OTHER PUBLICATIONS

"International Search Report and Written Opinion Issued in PCT Application No. PCT/US18/064149", dated Mar. 13, 2019, 11 Pages.

* cited by examiner

Caption: Singapore Cup

|  | Year | Champions | Runners-up |
|---|---|---|---|
| Attribute | Year | Champions | Runners-up |
| Cell | 1996 | Geylang United | Singapore Armed Forces |
| Cell | 1997 | Singapore Armed Forces | Woodlands Wellington |
| Cell | 1998 | Tanjong Pagar United | Sembawang Rangers |

220

⇩

240

Text: *Singapore Armed forces was the champion of Singapore Cup in 1997.*

FIG. 2

GENERATION OF TEXT FROM STRUCTURED DATA

CROSS-REFERENCE TO RELATED APPLICATION

This application is a U.S. National Stage Filing under 35 U.S.C. 371 of International Patent Application Serial No. PCT/US18/064149, filed Dec. 6, 2018, and published as WO 2019/118256 on Jun. 20, 2019, which claims priority to Chinese Application No. 201711348978.7, filed Dec. 15, 2017, which applications and publication are incorporated herein by reference in their entirety.

BACKGROUND

Structured data such as a table is a widely-used type of data source on the network, which has a formal structure and contains valuable information. Understanding the meaning of structured data such as a table and correctly describing its content is an important problem in the field of artificial intelligence. Some potential applications include question answering systems, building conversational agents, and supporting search engines.

At present, a template-based method may be used to transform a table into a text. However, this method largely depends on manpower and requires a higher cost. High manpower cost makes it impossible to handle various problems. A natural language processing model based a neural network is extensively applied to such a field as machine translation. However, machine translation is to transform or convert a natural language into another natural language. Hence, currently it is desirable to provide an effective solution for conversion or transformation of structured data such as tables into a natural language.

SUMMARY

In accordance with implementations of the subject matter described herein, there is provided a solution of generating a text from the structured data. In this solution, the structured data is converted or transformed into its representation, where the structured data comprises a plurality of cells, and the representation of the structured data comprises a plurality of representations of the plurality of cells. A natural language sentence associated with the structured data may be determined based on the representation of the structured data, thereby implementing the function of converting the structured data into a text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is a schematic diagram illustrating a task of converting a table into a text according to an implementation of the subject matter described herein;

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. Unless otherwise explicitly specified, definitions of terms are consistent throughout the description.

Example Environment

Figure 1:
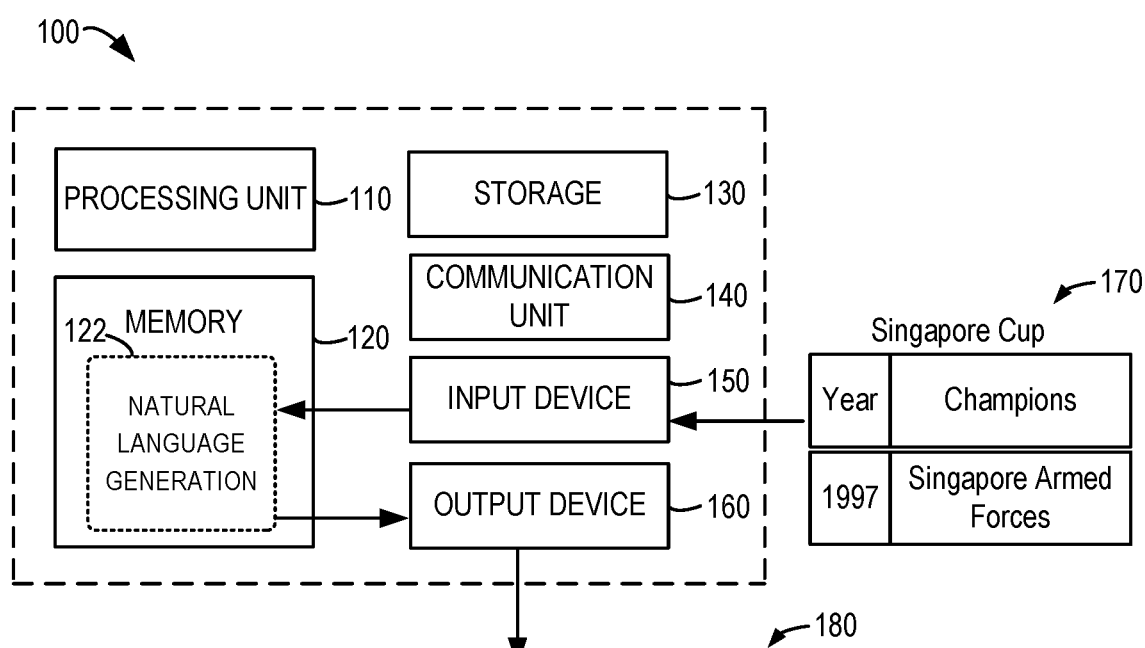
FIG. 1 is a block diagram illustrating a computing device in which implementations of the subject matter described herein can be implemented.

Basic principles and several example implementations of the subject matter described herein will be explained below with reference to the drawings. FIG. 1 is a block diagram illustrating a computing device 100 in which implementations of the subject matter described herein can be implemented. It is to be understood that the computing device 100 as shown in FIG. 1 is only exemplary and shall not constitute any limitations to the functions and scopes of the implementations described herein. As shown in FIG. 1, the computing device 100 includes a computing device 100 in the form of a general purpose computing device. Components of the computing device 100 may include, but not limited to, one or more processors or processing units 110, a memory 120, storage 130, one or more communication units 140, one or more input devices 150, and one or more output devices 160.

In some implementations, the computing device 100 can be implemented as various user terminals or service terminals with computing power. The service terminals can be servers, large-scale computing devices and the like provided by a variety of service providers. The user terminal, for example, is a mobile terminal, a stationary terminal, or a portable terminal of any types, including a mobile phone, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device, or any other combinations thereof including accessories and peripherals of these devices or any other combinations thereof. It may also be contemplated that the computing device 100 can support any types of user-specific interfaces (such as "wearable" circuit and the like).

The processing unit 110 can be a physical or virtual processor and can perform various processing based on the programs stored in the memory 120. In a multi-processor system, a plurality of processing units executes computer-executable instructions in parallel to enhance parallel processing capability of the computing device 100. The processing unit 110 also can be known as a central processing unit (CPU), a microprocessor, a controller, and a microcontroller.

The computing device 100 usually includes a plurality of computer storage media. Such media can be any available media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include an image processing module 122 configured to perform functions of various implementations described herein. The image processing module 122 can be accessed and operated by the processing unit 110 to perform corresponding functions.

The storage 130 may be removable or non-removable medium, and may include machine executable medium, which can be used for storing information and/or data and can be accessed within the computing device 100. The computing device 100 may further include a further removable/non-removable, volatile/non-volatile storage medium. Although not shown in FIG. 1, a disk drive may be provided for reading or writing from a removable and non-volatile disk and an optical disk drive may be provided for reading or writing from a removable and non-volatile optical disk. In such cases, each drive can be connected via one or more data medium interfaces to the bus (not shown).

The communication unit 140 carries out communication with another computing device through communication media. Additionally, functions of components of the computing device 100 can be implemented by a single computing cluster or a plurality of computing machines and these computing machines can communicate through communication connections. Therefore, the computing device 100 can be operated in a networked environment using a logical connection to one or more other servers, a Personal Computer (PC), or a further general network node.

The input device 150 can be one or more various input devices, such as a mouse, a keyboard, a trackball, a voice-input device, and/or the like. The output device 160 can be one or more output devices, for example, a display, a loudspeaker, and/or printer. The computing device 100 also can communicate through the communication unit 140 with one or more external devices (not shown) as required, where the external device, for example, a storage device, a display device, communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

The computing device 100 may be used to perform the function of converting structured data into a text according to implementations of the subject matter described herein. The structured data herein represents information having a higher organization degree so that it can be seamlessly included in a relationship database and can be searched by a simple and direct search algorithm. For example, the structured data may be data or information represented by the relationship database, for example, a table or a knowledge base in knowledge graph.

When performing conversion from the structured data to the text, the computing device 100 may receive the structured data 170 such as a table via the input device 150. The computing device 100 may process the structured data 170 to convert the structured data 170 or a portion of the structured data 170 into a corresponding descriptive text 180. The computing device 100 may output the descriptive text 180 via the output device 160, as an output of the computing device 100. As shown in FIG. 1, the structured data 170 is a simple table from which the following descriptive text 180 may be extracted: "Singapore Armed Forces was the champion of Singapore Cup in 1997."

Introduction

Structured data such as a table is a widely-used type of data source on the network, which has a formal structure and contains valuable information. For ease of description, description is presented below mainly with reference to the table as a type of structured data. However, it should be appreciated that implementations of the subject matter described herein may also be applied to other types of structured data, for example, knowledge graph.

As described above, understanding the meaning of structured data such as a table and describing its content is an important problem in artificial intelligence. According to some implementations of the subject matter described herein, a natural language sentence such as a descriptive text may be generated based on a table or a portion of the table (also referred to as a table region). The descriptive text may use natural language to describe the table or table region (e.g., a row of the table).

The task of table-to-text conversion could be used to support many applications, such as search engines and conversational agents. On one hand, the task could be used to generate descriptive sentences for the structured tables on the web. Current search engines could serve structured tables as answers by regarding the generated sentences as keys and tables as values. On the other hand, tables could also be used as responses for conversational agents such as the intents of ticket booking and production comparison. However, it is impractical for a conversational agent to read and analyze a table of a plurality of rows and columns on a smart-phone. Table-to-text technology could transform the data into natural language sentences which could be sent back to users with utterances or voice via text-to-speech transformation.

Task Description

FIG. 2 is a schematic diagram illustrating a task of transforming a table into a text according to an implementation of the subject matter described herein. As shown in FIG. 2, the input of the task is a table 220, and its output is a natural language sentence 240 describing the table 220 or a portion of the table 220. A typical table includes a caption, one or more rows and one or more columns, and cells of the table are located at intersections of the rows and columns.

A table T may be defined as a tuple T={Attribute, Cell, Caption}, where Attribute $\{a_1, \ldots, a_N\}$ includes N attributes (column headers) of the table. Cell(s) $\{c_1^1, \ldots, c_N^1, \ldots, c_1^M, \ldots, c_N^M\}$ includes N*M cells of the table, where N is the number of columns, M is the number of rows, $c_i^j$ is the cell where the $i^{th}$ column and $j^{th}$ row interacts. Caption, as the overall attribute of the table, is typically a natural language explanatory about the entire table. It should be appreciated that the table as shown in FIG. 2 is an example of a table in a typical form. However, in some tables, the caption and/or attributes may not be included.

For example, the table shown in FIG. 2 includes the caption "Singapore Cup" and includes three attributes "Year," "Champions," and "Runners-up." In addition, the table further includes a total of 9 cells in three rows, which respectively represent champions and runners-up from 1996 to 1998.

According to the implementation of the subject matter described herein, a row of cells of the table are selected as an input. As shown in FIG. 2, a highlighted row about the year 1997 of the table is selected as an input. Accordingly, it is desirable to output a descriptive sentence describing the row of data (or a portion thereof), for example, "Singapore Armed Forces was the champion of Singapore Cup in 1997." The descriptive sentence only uses information in the column of champions without using information in the column of runners-up.

Sequence-to-Sequence Architecture

At present, a technique widely applied in the field such as machine translation is sequence-to-sequence learning. The main idea of the architecture is that it first encodes the meaning of a source sequence into a continuous vector by an encoder, and then decodes the vector to a target sequence with a decoder. A neural network for seq2seq learning is briefly introduced herein. The seq2seq architecture is briefly introduced now to facilitate the understanding of the implementation of the subject matter described herein, not to explicitly or implicitly indicate that implementations of the subject matter described herein can be readily obtained based on the architecture.

The seq2seq architecture includes an encoder and a decoder. The goal of the encoder component is to represent a variable-length source sequence $x=\{x_1, \ldots, x_N\}$ as a fixed-length continuous vector, where $x_1$ to $x_N$ represent N words in the source sequence. The encoder can be implemented with various neural network architectures such as a convolutional neural network (CNN) and a recurrent neural network (RNN). Taking RNN as an example, the encoder processes the source sequence word by word by transforming a word in a step with the output vector in the previous step. The processing is formulated as $h_t=f_{enc}(x_t, h_{t-1})$ where $f_{enc}(\ )$ is a nonlinear function, $x_t$ represents a word input at a time step t, and $h_{t-1}$ represents a hidden vector at the time step t−1. The last hidden vector $h_N$ may be used as the representation of the input sequence x.

The decoder receives the output of the encoder (for example, a representation vector $h_N$ of the source sequence), and outputs a target sequence y. The decoder may be implemented with RNN, which generates a word $y_t$ at each time step t based on the representation of x (for example, $h_N$) and the previously predicted word sequence $y_{<t}=\{y_1, y_2, \ldots, y_{t-1}\}$. The process may be represented by Equation (1):

$$p(y|x) = \prod_{t=1}^{T} p(y_t | y_{<t}, x) = \prod_{t=1}^{T} f_{dec}(y_{t-1}, s_{t-1}) \quad (1)$$

where p(y|x) represents a probability of y under condition x, $\prod_{t=1}^{T}(\ )$ represents a product of corresponding variables when t is between 1 and T, $f_{dec}(\ )$ is a nonlinear function, and $s_t=f_{hid}(y_{t-1}, s_{t-1})$ is the hidden state of RNN at time step t. Since standard RNN suffers from the problem of gradient vanishing, it is possible to use a gated RNN unit such as Long Short-Term Memory (LSTM) or Gated Recurrent Unit (GRU) for $f_{hid}(\ )$.

Table Aware Encoder

Figure 3:
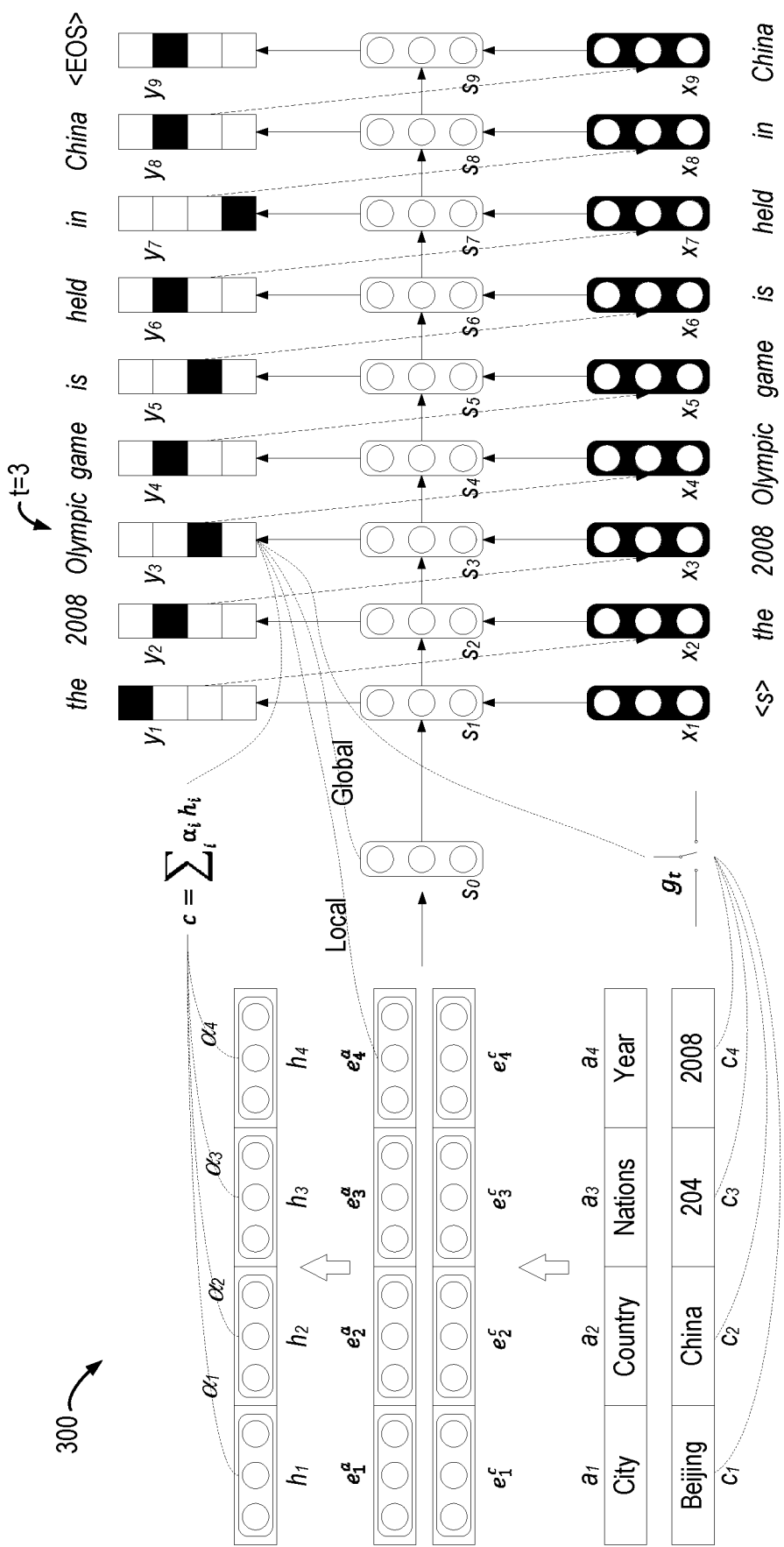
FIG. 3 illustrates a neural network architecture for generating a text from structured data according to an implementation of the subject matter described herein.

FIG. 3 illustrates neural network architecture 300 for generating a text from structured data according to an implementation of the subject matter described herein. It should be appreciated that the neural network architecture 300 shown in FIG. 3 is provided for illustrative purpose without suggesting any limitation as to the scope of the subject matter described herein. For example, one or more aspects of the neural network architecture 300 may be replaced by other structures, and one or more aspects may be added to or deleted from the neural network architecture 300. The left side of FIG. 3 shows a portion of the neural network architecture 300, which may also be called an encoder similar to the seq2seq architecture. The encoder may transform the table or table region into a corresponding representation, for example, a vector representation. The table region to be processed includes a list of cells in a row, for example, a list of cells $\{c_1^j, \ldots, c_N^j\}$ in the $j^{th}$ row. In addition, a corresponding list of attributes $\{a_1, \ldots, a_N\}$ may also be included. As shown in FIG. 3, the list of cells is $\{c_1, \ldots, c_4\}$, namely, {Beijing, China, 204, 2008}; the corresponding list of attributes is $\{a_1, \ldots, a_4\}$, namely, {City, Country, Nations, Year}.

In some implementations, it is possible to represent each cell $c_i^j$ as an embedding vector $e_i^c \in \mathbb{R}^{d_c}$, and optionally represent each attribute $a_i$ as a continuous vector $e_i^a \in \mathbb{R}^{d_a}$. This may be implemented by any embedding method currently known or to be developed in the future. The subject matter described here is not limited in this aspect. Then, it is possible to concatenate corresponding embedding vectors of the cell and attribute together, and represent it as $[e_i^c; e_i^a]$, to be provided to a linear layer. Then, an element-wise nonlinear function tanh ( ) may be applied to the output $W_e[e_i^c; e_i^a] + b_e$ of the linear layer to obtain a representation $h_i$ of each column. The above process may be represented by the Equation $h_i = \tanh(W_e[e_i^c; e_i^a] + b_e)$.

Since the caption may also include a small number of words, in some implementations, the caption may be treated as a special cell and use a virtual attribute "caption" for the cell. These vectors $\{h_1, h_2, \ldots, h_N\}$ may serve as a representation of the input table region to be provided to the decoder and an attention module.

In some implementations, an element-wise average may be performed on these column vectors $\{h_1, h_2, \ldots, h_N\}$, and the result may be used as the initial hidden state so of the decoder. In this way, it can be ensured that the same result will be obtained if randomly exchanging two columns.

Table Aware Decoder

The right side of FIG. 3 shows a decoder according to an implementation of the subject matter described herein, the decoder intended to generate a natural language sentence describing the table or table region. According to some implementations of the subject matter described herein, the decoder shown in FIG. 3 is implemented with GRU-based RNN (called GRU-RNN). However, those skilled in the art should appreciate that it is also possible to use any other proper neural network architecture, particularly recurrent neural network (RNN) architecture. The subject matter described herein is not limited in this regard.

The decoder as shown in FIG. 3 operates in a time sequence manner and generates a word $y_t$ at each time step t. The sequence of words generated at all time steps form a natural language sentence describing the table region. For example, as shown in FIG. 3, at the time step t=3, output $y_2$ of the previous time step t=2 is considered as input $x_3$, the input $x_3$ is transformed into an embedding vector via an embedding layer for provision to GRU, and the GRU receives a hidden state $s_2$ of the previous time step t=2, and a hidden state $s_3$ of the current time step is generated based on the hidden state $s_2$ and input $x_3$ of the previous time step t=2 and provided to next time step t=4. In addition, the hidden state $s_3$ may be further provided to a softmax layer to calculate probabilities of words in a vocabulary table.

On the basis of the above GRU-RNN model, to further consider the structure of the table and generate a descriptive sentence related to the table, the subject matter described herein may be extended in one or more aspects. Some extensions will be described below one by one. It should be appreciated that these aspects may be implemented separately or in combination. The subject matter described herein is not limited in this regard.

Attention Module

In some implementations, the decoder may selectively consider important information in the table or table region. For example, when generating words of natural language sentences describing the table region at each time step, the decoder may selectively use the important information in the table region. In addition, important information in attributes and/or caption may be further considered. As shown in FIG. 3, for example, the decoder pays more attention to a cell "2008" at the second time step, and makes more use of information of the cell "China" at the eighth time step.

At each time step, the attention module may assign a corresponding probability/weight to each column. According to some implementations, the probability/weight may consider the attention result of the previous time step. For example, at the time step t, the attention weight $\alpha_{<t,i>}$ of the $i^{th}$ column may be calculated according to Equation (2):

$$\alpha_{\langle t,i \rangle} = \frac{\exp\left[z\left(s_{t-1}, h_i, \sum_{j=1}^{N} \alpha_{\langle t-1,j \rangle} h_j\right)\right]}{\sum_{i'=1}^{H} \exp\left[z\left(s_{t-1}, h_{i'}, \sum_{j=1}^{N} \alpha_{\langle t-1,j \rangle} h_j\right)\right]} \quad (2)$$

where $h_i$ is the vector representation of the $i^{th}$ column generated by the encoder, $s_{t-1}$ is the hidden state of the GRU decoder at the time step t−1, and z( ) is a nonlinear function that computes the importance of $h_i$. The importance of $h_i$ will be further normalized with a softmax function to obtain the attention weight $\alpha_{<t,i>}$ of the $i^{th}$ column. The attention mechanism considers the attention result of the previous time step. In this way, the model has the ability to remember which columns have been used before, and not to use such columns in the following time steps.

In some implementations, the update of the GRU hidden state in the decoder may consider the attention probability. For example, a context vector $c_t$ at each time step t may be calculated according to Equation (3):

$$c_t = \sum_{i=1}^{N} \alpha_{\langle t,i \rangle} h_i \quad (3)$$

Then, a hidden state $s_t$ of the time step t may be calculated according to Equation (4) by using the context vector $c_t$, the hidden state $s_{t-1}$ and output $y_{t-1}$ of the previous time step t−1:

$$s_t = GRU(y_{t-1}, s_{t-1}, c_t) \quad (4)$$

Global Parameter and Local Parameter

In some implementations, to increase the correlation between the natural language sentence and the table or table region, global information of the table may be considered in the decoder. For example, the decoder may use different implicit patterns to deal with tables about different topics, such as "Olympic game" and "music album." As the output of the encoder captures information about the entire table, so may be used to represent the global information, which is a part of the input of the target softmax function.

In some implementations, a local parameter may be used in the decoder to remember the relation between the table or table region and the generated word $y_{t-1}$ in the last time step t−1. For example, the corresponding attribute of the word $y_{t-1}$ may be used as the local parameter, and its embedding vector $l_{t-1}$ may be used as a part of the input of the target softmax function. For example, a special symbol (for example, <unk_a>) may be used to represent the attribute of $y_{t-1}$ if the word $y_{t-1}$ does not come from the table or table region.

Copying Mechanism

Cells in a table typically include informative but low-frequency words, such as named entities and numbers. These words are very important to represent the meaning of a table, so that these low-frequency words in the table may be considered when the table region is transformed into a text. In a conventional RNN decoder, at each time step, a probability of each word is calculated over a predetermined vocabulary according to the softmax function, for example, and the word to be output is determined therefrom. For example, the vocabulary may include 20,000 high-frequency words. However, since rare words from the table cannot be well covered in the vocabulary, the rare words could not be generated in the predicted sequence. In addition, enlarging vocabulary size blindly is not a practical way to solve this problem because the method could not handle the rare words absent in the training data.

According to some implementations of the subject matter described herein, a copying mechanism for copying words from the table may be used to solve the issue of low-frequency words. For example, the word to be output may be determined by combining the two manners at each time step. In the first manner, words are generated from the target vocabulary via for example the softmax function, while in the second manner, words may be copied from the table via the copying mechanism.

In some implementations, if the word $\tilde{y}$ is copied from the table region, a probability of selecting the word $\tilde{y}$ from these cells for use in the natural language sentence may be determined based on the importance of the plurality of cells of the table region. For example, at the time step t, if the word $\tilde{y}$ is copied from the table region, the probability of using the word $\tilde{y}$ as the output of the time step t may be represented as $\alpha\langle t, id(\tilde{y})\rangle$, where $id(\tilde{y})$ represents a column index of $\tilde{y}$, and $\alpha\langle t, id(\tilde{y})\rangle$ represents an attention weight/probability of the word $\tilde{y}$ determined by the attention module at the time step t.

In some implementations, if the word $\tilde{y}$ is generated from the predetermined vocabulary, a probability $\beta_t(\tilde{y})$ of selecting the word $\tilde{y}$ from the predetermined vocabulary for use in the natural language sentence may be determined. This may be implemented by a conventional method. For example, at each time step t, a probability of each word is calculated on the predetermined vocabulary based on the softmax function, for example. In addition, during calculation of the probability of words in the vocabulary, the global parameter and/or local parameter may be further considered, and may be regarded as a part of the input of the softmax function. For example, the hidden state $s_t$ and the global parameter so and/or local parameter $l_{t-1}$ may be connected together as the input of the softmax function.

In some implementations, a neural gate $g_t$ may be used to select between the two manners. For example, the neural gate $g_t$ may be represented by Equation (5):

$$g_t(\cdot) = \sigma(W_g[W_e y_{t-1}; s_t; c_t; s_0; l_{t-1}] + b_g) \quad (5)$$

where $\sigma$ represents a sigmoid function, $W_e y_{t-1}$ represents an embedding vector of $y_{t-1}$, and $W_g$ and $b_g$ respectively represent weights and biases of the neural gate.

If the two manners are combined, the probability of copying the word $\tilde{y}$ from the cell(s) of the table region may be represented as $g_t(\tilde{y}) \odot \alpha \langle t, id(\tilde{y}) \rangle$, where $\odot$ represents element-wise multiplication. On the other hand, the probability of generating the word $\tilde{y}$ from the target vocabulary is $(1 - g_t(\tilde{y})) \odot \beta_t(\tilde{y})$. Hence, the probability of using the word $\tilde{y}$ in the target natural language sentence may be represented by Equation (6):

$$p_t(\tilde{y}) = g_t(\tilde{y}) \odot \alpha \langle t, id(\tilde{y}) \rangle + (1 - g_t(\tilde{y})) \odot \beta_t(\tilde{y}) \quad (6)$$

An advantage of the above copying mechanism is that during training it does not have a preference for copying from the table region or generating words from target vocabulary. This property makes the model more flexible and could be trained and tested in the same way as the conventional method.

Implementation of copying words from cells in the table has been introduced above. However, it should be appreciated that the above cells may only refer to typical cells, or may include cells formed by overall attributes of the table such as the caption. The subject matter described herein is not limited in this aspect. In some implementations, words may further be copied from attributes. This may be implemented by incorporating the embedding vector and the attention probability of the attribute.

Example Process

Figure 4:
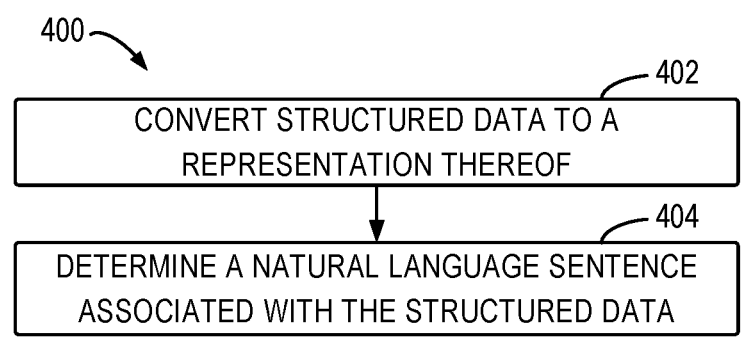
FIG. 4 is a flow chart illustrating a method for generating a text from structured data according to an implementation of the subject matter described herein.

FIG. 4 is a flow chart illustrating a method 400 for generating a text from structured data according to an implementation of the subject matter described herein. The method may be implemented by a computing device 100 as shown in FIG. 1, and for example may be implemented by the neural network architecture shown in FIG. 3. However, it should be appreciated that one or more aspects may be removed from the neural network architecture shown in FIG. 3, and one or more aspects may also be added to the neural network architecture as shown in FIG. 3.

At 402, structured data is converted into a representation of the structured data, the structured data including a plurality of cells and the representation of the structured data comprises plurality of representations of the plurality of cells. For example, this may be implemented by a first portion (e.g., the encoder portion as shown in FIG. 3) of the neural network. For example, the structured data may be the table as shown in FIG. 2, and the plurality of cells form a row of the table. In the neural network architecture as shown in FIG. 3, the representation of each cell in the plurality of cells may be a vector, for example, a column vector.

Optionally, the table may include a plurality of attributes and/or overall attribute (for example, caption) associated with the plurality of cells. If the table includes a plurality of attributes, the representation of each cell further indicates a corresponding attribute, and further indicates association between the cell and the corresponding attribute. For example, in Table 2, the cell "1997" and its associated attribute "year" may be combined together and transformed into a column vector, to represent the cell-attribute pair. In addition, if the table includes a caption, the caption may be regarded as a cell and transformed into a column vector as its representation. If necessary, the caption and the virtual attribute may be combined and transformed into a column vector as its representation.

At 404, the natural language sentence associated with the structured data is determined based on the representation of the structured data, the natural language sentence including a sequence of the plurality of words. For example, this may be implemented by a second portion (e.g., the decoder portion shown in FIG. 3) of the neural network. The natural language sentence may be used to describe the structured data.

In some implementation, the second portion of the neural network includes a recurrent neural network (RNN), and the recurrent neural network may be used to sequentially determine a plurality of words in the natural language sentence. The recurrent neural network may include for example a Gated Recurrent Unit (GRU) and/or Long Short-Term Memory (LSTM) Unit.

In some implementations, the sequence of the plurality of words in the natural language sentence includes a first word. The first word may be determined by determining a first probability of selecting a first candidate word from the plurality of cells for use as the first word, and determining a second probability of selecting a first candidate word from a predetermined vocabulary for use as the first word. A probability of using the first candidate word as the first word may be determined based on the first probability and second probability. If the first candidate word only exists in the predetermined vocabulary, the first probability may not be calculated; in other words, the first probability may be believed to be equal to zero. On the other hand, if the first candidate word only exists in the structured data, the second probability may not be calculated; in other words, the second probability may be believed to be equal to zero.

In some implementations, the neural network further includes a third portion which may be the attention module as shown in FIG. 3. The method 400 may further comprise using the third portion to determine the importance of the plurality of cells for the first word, for example, calculating the importance of the plurality of cells at the time step when the first word is determined. Then, the first probability of selecting the first candidate word for use as the first word may be determined based on the importance of the plurality of cells for the first word.

In some implementations, the sequence of the plurality of words further includes a second word located before the first word in the sequence. In this case, the importance of the plurality of cells with respect to the first word may be determined at least partly based on importance of the plurality of cells with respect to the second word. For example, the importance of the plurality of cells at the current time step may be determined based on importance of the plurality of cells at the last time step. If the first word is an initial word of the sequence, the second word may be a beginning symbol, e.g., <s> shown in FIG. 3.

In some implementations, an initial state of the recurrent neural network may be determined by averaging the plurality of representations of the plurality of cells. For example, the initial state of the recurrent neural network may be obtained by averaging column vectors of the plurality of cells, for example, the global parameter so shown in FIG. 3. In this case, it is possible to determine the second probability of selecting the first candidate word from the predetermined vocabulary for use as the first word based on the initial state of the recurrent neural network. For example, in the example shown in FIG. 3, the global parameter so may be provided to the softmax function as a part of the input.

In some implementations, the second probability of selecting the first candidate word from the predetermined vocabulary for use as the first word may be determined based on an attribute of the second word. For example, if the second word comes from the structured data, the attribute of the second word may be an attribute of the second word in the structured data. If the second word does not come from the structured data, the attribute of the second word may be represented by a predefined special value. For example, the local parameter is described above with reference to FIG. 3 and may be provided to the softmax function as a part of the input.

In some implementations, the sequence of the plurality of words includes the first word and the second word located before the first word, and the neural network further includes a third portion, and the method 400 further comprises using the third portion to determine the importance of the plurality of cells for the first word based in part on the importance of the plurality of cells for the second word, and determining the first word comprises: determining a probability of selecting a first candidate word from a predetermined vocabulary for use as the first word based on the importance of the plurality of cells for the first word. In these implementations, the copying mechanism is not carried out. However, since recurrent computing is performed when the importance is computed, a remarkable improvement effect can be implemented in some application scenarios.

In some implementations, a fact in the knowledge base may be converted into a row of table having two cells, and the table may be converted into its representation for conversion into a natural language sentence. For example, the fact that "a dog is an animal" may be converted into a table having two cells: "dog" and "animal." Optionally, the relation "is" (isA) may serve as a caption of the table. For example, the natural language sentence may be presented in the form of a question. In the above example, the question may be "is a dog an animal?"

Training and Inference

In some implementations, the model as shown in FIG. 3 is trained in an end-to-end fashion using back-propagation under the objective as shown by Equation (7):

$$\mathcal{L} = -\frac{1}{|D|} \sum_{(x,\hat{y}) \in D} \sum_{t=1}^{T'} \log(p(\hat{y}_t \mid \hat{y}_{<t}, x)) \qquad (7)$$

where D represents a training set. In the inference process, beam search may be used to generate the top-K confident results where K represents the beam size.

Experiment

To evaluate an effect of the text-generating model of implementations of the subject matter described herein, test and analysis is performed on three datasets including WIKITABLETEXT, WIKIBIO and SIMPLEQUESTIONS, where the dataset WIKITABLETEXT is created by the present inventors, so its construction process is briefly introduced first.

First, it is possible to crawl tables from Wikipedia, randomly select 5,000 regular tables each at least having three rows and two columns. Regarding each table, randomly select three rows, resulting in 15,000 rows that are further used for manual annotation. Each annotator is given a selected row, the corresponding attributes and the caption. It is required that rows from the same table are labeled by different annotators. If a table does not contain a caption, its page title is used instead. Each annotator is asked to write a sentence to describe at least two cells from a table, but not required to cover every cell. For example, the sentence in FIG. 2 does not use the "Runner-up" column. In addition, annotators are asked not to search the meaning of a table from the web. In this manner, it can be ensured that external knowledge is not used for judgment. This makes the dataset more suitable for the real scenario. To increase the diversity of the generated language, different rows are assigned from the same table to different annotators. If a row is hard to be described, the annotator is asked to write "It's-hard-to-annotate." Finally, 13,318 row-text pairs are obtained. Statistics are given in Table 1. The entire dataset may be randomly split into training sets (10,000), development sets (1,318), and test sets (2,000).

TABLE 1

| Type | Value |
| --- | --- |
| Number of tables | 4,962 |
| Number of sentences | 13,318 |
| Avg # sentences per table | 2.68 |
| Avg # words per sentence | 13.91 |
| Avg/Min/Max # words per caption | 3.55/1/14 |
| Avg/Min/Max # cells per sentence | 4.02/2/10 |
| Avg/Min/Max # rows per table | 7.95/3/19 |

Current datasets WEATHERGOV and ROBOCUP are respectively restricted to a specific domain, such as weather forecasting and RoboCup sports casting. However, WIKITABLETEXT is not restricted to a specific domain, and is an open-domain dataset instead. WIKITABLETEXT may bring more challenges and might be more useful in real world applications.

The same experiment setting may be used for these three datasets WIKITABLETEXT, WIKIBIO and SIMPLEQUESTIONS. First, the parameters in the model may be randomly initialized with a Gaussian distribution, the dimension of the word/attribute embedding vector may be set to be 300, and the dimension of the decoder hidden state may be set to be 500. In this example, Ada-delta method is adopted to adapt the learning rate. A development set is used to halve the learning rate when the performance on the development set does not improve for 6 continuous epoches. Parameters are updated in an end-to-end fashion using back-propagation. In the inference process, beam search is used and the beam size is set as 5. BLEU-4 score is used as an evaluation metric. BLEU-4 score is widely used for natural language processing tasks, such as machine translation, question generation, and dialogue response generation. Each instance in these datasets has only one reference sentence.

When experiments are conducted on the dataset WIKITABLETEXT, the caption may be treated as a special cell for processing and a virtual attribute "caption" may be used for the cell. As shown in Table 1, the caption has 3.55 words by average.

A comparison model includes using a table conditional neural language model (TC-NLM), which is based on a recurrent neural network language model. The model is provided with local information and global information to make the model also consider table information. In addition, the comparison model further comprises a random-copying model which does not use the copying mechanism shown in FIG. 3 but replaces the <unk> with a randomly selected cell from the table. In addition, the comparison model further comprises a template-based model. During the training process, a list of templates ranking by frequency is constructed for each table scheme. The templates are derived by replacing the cells appearing in the text with the corresponding attributes. In the inference process, given a table scheme, the template with the highest frequency may be selected and a text may be generated by replacing the attributes with the corresponding values.

TABLE 2

| Setting | Development | Test |
| --- | --- | --- |
| TC-NLM | 5.31 | 5.79 |
| Random-copying | 11.11 | 12.01 |
| Template | 29.10 | 28.62 |
| Table2Seq | 35.69 | 37.90 |
| Table2Seq w/o Caption | 26.21 | 27.06 |
| Table2Seq w/o Copying | 4.78 | 5.41 |
| Table2Seq w/o Global | 34.82 | 36.68 |
| Table2Seq w/o Local | 34.08 | 36.50 |
| Table2Seq++ | 36.68 | 38.23 |

Table 2 shows the experiment results of the model with different settings, where Table2Seq represents the model shown in FIG. 3, and Table2Seq++ represents a situation in which the attributes of the table are considered. The experiment results indicate the solution according to implementations of the subject matter described herein outperforms the comparison model. In addition, the experiment results further indicate the influence exerted by aspects of the experiments according to the subject matter described herein on the performance of the model. It can be seen from Table 2 that the copying mechanism has a larger influence on the performance. Table 3 further shows comparative data of generated sentences by using copying mechanism or not, and further reflects the important influence of the copying mechanism.

TABLE 3

Reference sentence: abe forsythe acted as ned kelly in movie ned in 2003.
Table2Seq: abe forsythe acted as ned kelly in the ned in 2003.
Table2Seq w/o Copying: <unk> played in <unk> in 2003.

As shown in Table 2, caption is also a relatively important factor because the caption usually contains important information for generating the description. On this dataset, the global parameter and local parameter do not have a big influence on the results. In addition, Table 2 further shows that contents of table attributes are also useful for describing a table. As Table2Seq++ can copy from both the cells and attributes, the effect of the model is further enhanced. Table 4 further shows comparative examples for copying attributes or not, wherein "capacity" is a word in the attribute.

TABLE 4

Reference sentence: the capacity of cyclone triple was triple.
Table2Seq++: the capacity of cyclone triple was triple.
Table2Seq: the <unk> of cyclone triple was triple.

Since the experiment results indicate that the copying mechanism is the most effective component, analysis is further performed for the reason why it has such strong an impact on the results. As the attention probabilities are the main part of the copying mechanism, analysis is performed for probabilities for each table cell to be copied at each time step. In this example, the reference sentence is shown in Table 3, which contains many table cells that are usually rare words. The model according to the implementation of the subject matter described herein generates a fluent sentence substantially consistent with the reference sentence, and the sentence includes the sequence of words {abeforsythe; acted; as; nedkelly; in; the; ned; in; 2003}. In this sentence, words abe forsythe, ned Kelly, ned, 2003 generated at the time steps 1, 4, 7 and 9 are words copied from the cells of the table. It is known from analysis that at the time steps 1, 4, 7 and 9, the corresponding cells have the highest probability of being copied. This indicates that the model according to the implementation of the subject matter described herein has the ability to properly copy rare words from the table.

In addition, it is also found that the learned gate has the ability of automatically deciding to copy from table or generate from target vocabulary. For example, there is a very high probability of copying from the cell "Ned Kelly" at the time step 2, but the model the model still generates the word "acted" from the vocabulary.

TABLE 5

| Group | Text |
| --- | --- |
| (1) | (Reference sentence) herman candries was the chairman of kv mechelen in 1977-82.<br>(Generated sentence) herman candries was the president of kv mechelen during 1977-82. |
| (2) | (Reference sentence) stoycho mladenov got 21 goals in the game in 1978.<br>(Generated sentence) stoycho mladenov got 21 goals in the pfc before stara zagora in 1978. |
| (3) | (Reference sentence) c. narayanareddy won the lifetime contribution award in cinemaa awards in 2010.<br>(Generated sentence) c. narayanareddy was the champion of cinemaa awards in 2010. |

In addition, 100 examples are sampled from the validation set (also referred to as the development set) and a case study is performed for these examples. Table 5 shows partial results of the case study. It can be seen from the results of groups 1-3 that the model according to the implementation of the subject matter described herein could generate fluent and table related sentences. In group 1, the model generates a sentence with the same meaning as the reference sentence, but uses different expressions. In groups 2 and 3, the model generates sentences with more or less information than the reference sentences as the model does not restrict which columns are used. For example, the cell "pfc before stara zagora" in group 2 as additional information is generated, while cell "lifetime contribution award" in group 3 is skipped. Although the generated sentences from groups 1 to 3 are meaningful and fluent, they may lower the BLEU-4 score.

In addition, test is also performed on the WIKIBIO dataset. The WIKIBIO dataset may be used to generate biography to describe an infobox. An infobox can be viewed as a table with one row. In this dataset, the first sentence of each biography article is extracted as reference. On average, each reference sentence has 26.1 words. The corpus contains 728,321 instances, which has been divided into three subparts to provide 582,659 for training, 72,831 for validation and 72,831 for testing. In the experiments, 2,000 instances are used for validation. A characteristic of this dataset is that each cell of an infobox often contains plurality of words. Therefore, in the experiments, one cell is split into plurality of cells, wherein each new cell contains only one word.

TABLE 6

| Setting | Validation | Test |
| --- | --- | --- |
| KN | | 2.21 |
| TC-NLM | | 4.17 |
| Template KN | | 19.80 |
| Table NLM | | 34.70 |
| Table2Seq | 40.33 | 40.26 |
| Table2Seq w/o Copying | 37.28 | 36.88 |
| Table2Seq w/o Global | 40.69 | 40.11 |
| Table2Seq w/o Local | 40.34 | 40.03 |

Table 6 shows the experiment results on WIKIBIO dataset, and current KN, TC-NLM, Template KN and Table NLM methods are selected as baselines. It can be seen that the Table2Seq method obviously outperforms the known models. In addition, as attributes are usually not included in the dataset, Table2Seq++ is not applied. Removing the copying mechanism from the dataset does not dramatically decrease performance. This is because the average sentence length is much longer, so that the rare words have relatively little influence on the results. In addition, without considering the copying mechanism, the implementation of the subject matter described herein is still better than the known solution. A possible reason for this is the GRU-based decoder with recurrent attention.

In addition, test is also performed on the SIMPLEQUESTIONS dataset to generate questions from knowledge base (KB) facts. A fact in KB is a triple containing a subject, a predicate and an object. The predicate may also be called relationship. A fact may be regarded as a table with two attributes, which include a row with two cells. The SIMPLEQUESTIONS dataset contains 108,442 fact-question-answer tuples. The dataset is split into three parts: 75,910 for training, 10,845 for validation, and 20,687 for test.

TABLE 7

| Setting | Validation | Test |
| --- | --- | --- |
| Template | | 31.36 |
| SP Triples | | 33.27 |
| MP Triples | | 32.76 |
| SP Triples TransE++ | | 33.32 |
| MP Triples TransE++ | | 33.28 |
| Table2Seq | 40.16 | 38.85 |
| Table2Seq w/o Copying | 14.69 | 14.70 |
| Table2Seq w/o Global | 40.34 | 39.12 |
| Table2Seq w/o Local | 39.11 | 38.32 |

Table 7 shows comparative results of the comparison model and the model according to the subject matter described herein. Results show that the model according to implementations of the subject matter described herein outperforms the comparison model by a wide margin. This indicates that the solution according to the implementations of the subject matter described herein may generate natural language questions from KB facts.

EXAMPLE IMPLEMENTATIONS

Some example implementations of the subject matter disclosed herein are listed hereinafter.

According to some implementations of the subject matter described herein, there is provided a device. The device comprises: a processing unit; and a memory coupled to the processing unit and having instructions stored thereon which, when executed by the processing unit, cause the device to perform acts including converting structured data into a representation of the structured data by a first portion of a neural network, the structured data including a plurality of cells, and the representation of the structured data comprising a plurality of representations of the plurality of cells; and determining a natural language sentence associated with the structured data by a second portion of the neural network based on the representation of the structured data, the natural language sentence including a sequence of the plurality of words.

In some implementations, the plurality of cells form a row of a table, the structured data further comprise a plurality of attributes associated with the plurality of cells, and the plurality of representations of the plurality of cells further indicate the plurality of attributes and association between the plurality of cells and the plurality of attributes.

In some implementations, the plurality of cells form a row of a table, the structured data further comprise an overall attribute, and the representation of the structured data further comprise a representation of the overall attribute.

In some implementations, the second portion comprises a recurrent neural network, and determining the natural language sentence comprises using the recurrent neural network to sequentially determine plurality of words.

In some implementations, the sequence of the plurality of words comprises a first word, and determining the first word comprises determining a first probability of selecting a first candidate word from plurality of cells for use in the natural language sentence; determining a second probability of selecting the first candidate word from a predetermined vocabulary for use in the natural language sentence; and determining a probability of using the first candidate word as the first word in the natural language sentence based on the first probability and second probability.

In some implementations, the neural network further comprises a third portion, and the acts further comprise determining importance of the plurality of cells for the first word by the third portion, and determining the first probability comprises determining the first probability based on the importance of the plurality of cells for the first word.

In some implementations, the sequence of the plurality of words further comprises a second word located before the first word in the sequence of the plurality of words, and determining the importance of the plurality of cells for the first word comprises determining the importance of the plurality of cells for the first word based at least in part on importance of the plurality of cells for the second word.

In some implementations, the acts further comprise: determining an initial state of the recurrent neural network by averaging the plurality of representations of the plurality of cells, and determining the second probability comprises: determining, based on the initial state of the recurrent neural network, the second probability of selecting the first candidate word from the predetermined vocabulary for use in the natural language sentence.

In some implementations, the sequence of the plurality of words further comprises a second word located before the first word in the sequence of the plurality of words, and determining the second probability comprises: determining, based on an attribute of the second word, the second probability of selecting the first candidate word from the predetermined vocabulary for use in the natural language sentence.

In some implementations, the sequence of the plurality of words further comprise a first word and a second word located before the first word, and the neural network further comprises a third portion, and the acts further comprise determining the importance of the plurality of cells for the first word by the third portion based at least in part on the importance of the plurality of cells for the second word, and determining the first word comprises: determining a probability of selecting a first candidate word from a predetermined vocabulary for use as the first word based on the importance of the plurality of cells with respect to the first word.

In some implementations, the recurrent neural network comprises a Gated Recurrent Unit (GRU) or Long Short-Term Memory (LSTM) Unit.

In some implementations, the acts further comprise: converting a fact in a knowledge base into a row of a table having two cells for conversion into a representation of the table.

According to some implementations of the subject matter described herein, there is provided a method. The method comprises converting structured data into a representation of the structured data by a first portion of a neural network, the structured data including a plurality of cells, and the representation of the structured data comprising a plurality of representations of the plurality of cells; and determining a natural language sentence associated with the structured data by a second portion of the neural network based on the representation of the structured data, the natural language sentence including a sequence of the plurality of words.

In some implementations, the plurality of cells form a row of a table, the structured data further comprise a plurality of attributes associated with the plurality of cells, and the plurality of representations of the plurality of cells further indicate the plurality of attributes and association between the plurality of cells and the plurality of attributes.

In some implementations, the plurality of cells form a row of a table, the structured data further comprise an overall attribute, and the representation of the structured data further comprise a representation of the overall attribute.

In some implementations, the second portion comprises a recurrent neural network, and determining the natural language sentence comprises using the recurrent neural network to sequentially determine plurality of words.

In some implementations, the sequence of the plurality of words comprises a first word, and determining the first word comprises determining a first probability of selecting a first candidate word from plurality of cells for use in the natural language sentence; determining a second probability of selecting the first candidate word from a predetermined vocabulary for use in the natural language sentence; and determining a probability of using the first candidate word as the first word in the natural language sentence based on the first probability and second probability.

In some implementations, the neural network further comprises a third portion, and the method further comprises determining importance of the plurality of cells for the first word by the third portion, and determining the first probability comprises determining the first probability based on the importance of the plurality of cells for the first word.

In some implementations, the sequence of the plurality of words further comprises a second word located before the first word in the sequence of the plurality of words, and determining the importance of the plurality of cells for the first word comprises determining the importance of the plurality of cells for the first word based at least in part on importance of the plurality of cells for the second word.

In some implementations, the method further comprises: determining an initial state of the recurrent neural network by averaging the plurality of representations of the plurality of cells, and determining the second probability comprises: determining, based on the initial state of the recurrent neural network, the second probability of selecting the first candidate word from the predetermined vocabulary for use in the natural language sentence.

In some implementations, the sequence of the plurality of words further comprises a second word located before the first word in the sequence of the plurality of words, and determining the second probability comprises: determining, based on an attribute of the second word, the second probability of selecting the first candidate word from the predetermined vocabulary for use in the natural language sentence.

In some implementations, the sequence of the plurality of words further comprise a first word and a second word located before the first word, and the neural network further comprises a third portion, and the method further comprises determining the importance of the plurality of cells for the first word by the third portion based at least in part on the importance of the plurality of cells for the second word, and determining the first word comprises: determining a probability of selecting a first candidate word from a predetermined vocabulary for use as the first word based on the importance of the plurality of cells with respect to the first word.

In some implementations, the recurrent neural network comprises a Gated Recurrent Unit (GRU) or Long Short-Term Memory (LSTM) Unit.

In some implementations, the acts further comprise: converting a fact in a knowledge base into a row of a table having two cells for conversion into a representation of the table.

According to some implementations, there is provided a computer program product, comprising instructions tangibly stored on a computer-readable medium, the instructions, when executed by a machine, enabling the machine to execute a method. The method comprises converting structured data into a representation of the structured data by a first portion of a neural network, the structured data including a plurality of cells, and the representation of the structured data comprising a plurality of representations of the plurality of cells; and determining a natural language sentence associated with the structured data by a second portion of the neural network based on the representation of the structured data, the natural language sentence including a sequence of the plurality of words.

In some implementations, the plurality of cells form a row of a table, the structured data further comprise a plurality of attributes associated with the plurality of cells, and the plurality of representations of the plurality of cells further indicate the plurality of attributes and association between the plurality of cells and the plurality of attributes.

In some implementations, the plurality of cells form a row of a table, the structured data further comprise an overall attribute, and the representation of the structured data further comprise a representation of the overall attribute.

In some implementations, the second portion comprises a recurrent neural network, and determining the natural language sentence comprises using the recurrent neural network to sequentially determine plurality of words.

In some implementations, the sequence of the plurality of words comprises a first word, and determining the first word comprises determining a first probability of selecting a first candidate word from plurality of cells for use in the natural language sentence; determining a second probability of selecting the first candidate word from a predetermined vocabulary for use in the natural language sentence; and determining a probability of using the first candidate word as the first word in the natural language sentence based on the first probability and second probability.

In some implementations, the neural network further comprises a third portion, and the method further comprises determining importance of the plurality of cells for the first word by the third portion, and determining the first probability comprises determining the first probability based on the importance of the plurality of cells for the first word.

In some implementations, the sequence of the plurality of words further comprises a second word located before the first word in the sequence of the plurality of words, and determining the importance of the plurality of cells for the first word comprises determining the importance of the plurality of cells for the first word based at least in part on importance of the plurality of cells for the second word.

In some implementations, the method further comprises: determining an initial state of the recurrent neural network by averaging the plurality of representations of the plurality of cells, and determining the second probability comprises: determining, based on the initial state of the recurrent neural network, the second probability of selecting the first candidate word from the predetermined vocabulary for use in the natural language sentence.

In some implementations, the sequence of the plurality of words further comprises a second word located before the first word in the sequence of the plurality of words, and determining the second probability comprises: determining, based on an attribute of the second word, the second probability of selecting the first candidate word from the predetermined vocabulary for use in the natural language sentence.

In some implementations, the sequence of the plurality of words further comprise a first word and a second word located before the first word, and the neural network further comprises a third portion, and the method further comprises determining the importance of the plurality of cells for the first word by the third portion based at least in part on the importance of the plurality of cells for the second word, and determining the first word comprises: determining a probability of selecting a first candidate word from a predetermined vocabulary for use as the first word based on the importance of the plurality of cells with respect to the first word.

In some implementations, the recurrent neural network comprises a Gated Recurrent Unit (GRU) or Long Short-Term Memory (LSTM) Unit.

In some implementations, the acts further comprise: converting a fact in a knowledge base into a row of a table having two cells for conversion into a representation of the table.

According to some implementations, there is provided a computer-readable medium having computer-executable instructions stored thereon which, when executed by a device, cause the device to perform the method in the implementations above.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computing device, comprising:
a processing unit;
a memory coupled to the processing unit and having instructions stored thereon which, when executed by the processing unit, cause the device to perform acts comprising:
converting structured data in a table comprising rows of cell values and corresponding cell attribute values via an encoder into a vector representation of the structured data, the structured data comprising a plurality of cells, and the vector representation of the structured data comprising a plurality of vector representations of the plurality of cells; and
determining a natural language sentence associated with the structured data via a structured data table aware decoder on the vector representation of the structured data, the natural language sentence comprising a sequence of a plurality of words wherein determining the natural language sentence comprises sequentially determining the plurality of words by the decoder;

wherein the sequence of the plurality of words comprises a first word, and wherein determining the first word by the decoder comprises:

determining a first probability of selecting a first candidate word from plurality of cells for use in the natural language sentence;

determining a second probability of selecting the first candidate word from a predetermined vocabulary for use in the natural language sentence; and selecting the first candidate word as the first word in the natural language sentence based on the first probability and second probability.

2. The device according to claim 1, wherein the structured data further comprise an overall attribute, and the representation of the structured data further comprise a representation of the overall attribute.

3. The device according to claim 1, wherein the acts further comprise determining importance of the plurality of cells for the first word, and wherein determining the first probability comprises determining the first probability based on the importance of the plurality of cells for the first word.

4. The device according to claim 3, wherein the sequence of the plurality of words further comprises a second word located before the first word in the sequence of the plurality of words, and wherein determining the importance of the plurality of cells for the first word comprises:

determining the importance of the plurality of cells for the first word based at least in part on importance of the plurality of cells for the second word.

5. The device according to claim 1, wherein the acts further comprise determining an initial state of the recurrent neural network by averaging the plurality of representations of the plurality of cells, and wherein determining the second probability comprises:

determining, based on the initial state of the recurrent neural network, the second probability of selecting the first candidate word from the predetermined vocabulary for use in the natural language sentence.

6. The device according to claim 1, wherein the sequence of the plurality of words further comprises a second word located before the first word in the sequence of the plurality of words, and wherein determining the second probability comprises:

determining, based on an attribute of the second word, the second probability of selecting the first candidate word from the predetermined vocabulary for use in the natural language sentence.

7. The device according to claim 1, wherein the sequence of the plurality of words comprise a first word and a second word located before the first word, and wherein the acts further comprise determining the importance of the plurality of cells for the first word based at least in part on the importance of the plurality of cells for the second word, and wherein determining the first word comprises:

determining a probability of selecting a first candidate word from a predetermined vocabulary for use as the first word based on the importance of the plurality of cells for the first word.

8. The device according to claim 1, wherein the acts further comprise:

converting a fact in a knowledge base into a row of table having two cells to be converted to be a representation of the table.

9. A computer-implemented method, comprising:

converting structured data in a table comprising rows of cell values and corresponding cell attribute values via an encoder into a vector representation of the structured data, the structured data comprising a plurality of cells, and the vector representation of the structured data comprising a plurality of vector representations of the plurality of cells; and determining a natural language sentence associated with the structured data via a structured data table aware decoder on the vector representation of the structured data, the natural language sentence comprising a sequence of a plurality of words wherein determining the natural language sentence comprises sequentially determining the plurality of words by the decoder;

wherein the sequence of the plurality of words comprises a first word, and wherein determining the first word by the decoder comprises:

determining a first probability of selecting a first candidate word from plurality of cells for use in the natural language sentence;

determining a second probability of selecting the first candidate word from a predetermined vocabulary for use in the natural language sentence; and selecting the first candidate word as the first word in the natural language sentence based on the first probability and second probability.

10. A computer program product, comprising instructions stored on a non-transitory computer-readable medium, the instructions, when executed by a machine, enabling the machine to execute a method comprising:

converting structured data in a table comprising rows of cell values and corresponding cell attribute values via an encoder into a vector representation of the structured data, the structured data comprising a plurality of cells, and the vector representation of the structured data comprising a plurality of vector representations of the plurality of cells; and determining a natural language sentence associated with the structured data via a structured data table aware decoder on the vector representation of the structured data, the natural language sentence comprising a sequence of a plurality of words wherein determining the natural language sentence comprises sequentially determining the plurality of words by the decoder;

wherein the sequence of the plurality of words comprises a first word, and wherein determining the first word by the decoder comprises:

determining a first probability of selecting a first candidate word from plurality of cells for use in the natural language sentence;

determining a second probability of selecting the first candidate word from a predetermined vocabulary for use in the natural language sentence; and selecting the first candidate word as the first word in the natural language sentence based on the first probability and second probability.

* * * * *